(12) United States Patent
Schrader

(10) Patent No.: US 9,958,046 B2
(45) Date of Patent: May 1, 2018

(54) TORQUE CONVERTER TURBINE INCLUDING CORE RING HAVING THINNED SECTIONS

(71) Applicant: Schaeffler Technologies AG & Co. KG, Herzogenaurach (DE)

(72) Inventor: Scott Schrader, Canton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 475 days.

(21) Appl. No.: 14/619,902

(22) Filed: Feb. 11, 2015

(65) Prior Publication Data

US 2016/0230865 A1   Aug. 11, 2016

(51) Int. Cl.
*F16H 41/28*   (2006.01)
*F16H 45/02*   (2006.01)
*F16H 41/04*   (2006.01)
*F16H 41/24*   (2006.01)

(52) U.S. Cl.
CPC ............ *F16H 45/02* (2013.01); *F16H 41/04* (2013.01); *F16H 41/28* (2013.01); *F16H 41/24* (2013.01); *F16H 2045/0205* (2013.01); *F16H 2045/0231* (2013.01)

(58) Field of Classification Search
CPC ........................................................ F16H 41/28
See application file for complete search history.

(56) References Cited

U.S. PATENT DOCUMENTS

| | | | | |
|---|---|---|---|---|
| 5,109,604 | A * | 5/1992 | Koebele | F16H 41/28 29/889.21 |
| 5,813,227 | A * | 9/1998 | Dehrmann | F16H 41/28 60/361 |
| 6,622,834 | B2 * | 9/2003 | Bornschier | F16H 45/02 192/212 |
| 8,056,330 | B2 | 11/2011 | Parks et al. | |
| 9,651,129 | B2 * | 5/2017 | Dattawadkar | F16H 41/28 |
| 2013/0230385 | A1 | 9/2013 | Lindemann et al. | |

* cited by examiner

*Primary Examiner* — F. Daniel Lopez
(74) *Attorney, Agent, or Firm* — Davidson, Davidson & Kappel, LLC

(57) ABSTRACT

A torque converter turbine core ring is provided. The turbine core ring includes a plurality of arc sections having an inner circumference and an outer circumference and a plurality of weakened sections connecting the arc sections to each other. The weakened sections each having a lesser strength than each of the arc sections. A torque converter turbine, a torque converter and a method of forming a torque converter turbine are also provided.

16 Claims, 4 Drawing Sheets

TORQUE CONVERTER TURBINE INCLUDING CORE RING HAVING THINNED SECTIONS

The present disclosure relates generally to torque converter turbines and more specifically to torque converter turbine core rings.

BACKGROUND

Torque converters with axially movable turbines used as a piston of a lockup clutch are known, as disclosed for example in U.S. Publication No. 2013/0230385.

U.S. Pat. No. 8,056,330 discloses a multi-piece core ring.

SUMMARY OF THE INVENTION

A torque converter turbine core ring is provided. The turbine core ring includes a plurality of arc sections having an inner circumference and an outer circumference and a plurality of weakened sections connecting the arc sections to each other. The weakened sections each having a lesser strength than each of the arc sections.

A torque converter turbine is also provided. The torque converter turbine includes the turbine core ring, a plurality of turbine blades connected to the torque converter turbine core ring and a turbine shell connected to the turbine blades opposite the turbine core ring.

A torque converter is also provided. The torque converter includes the torque converter turbine and an impeller shell. The turbine is axially movable to engage and disengage the impeller shell so as to form a lockup clutch.

A method of forming a torque converter turbine is also provided. The method includes forming a core ring to include a plurality of arc sections and a plurality of weakened sections connecting the arc sections to each other, the weakened sections each having a lesser strength than each of the arc sections.

BRIEF DESCRIPTION OF THE DRAWINGS

The present invention is described below by reference to the following drawings, in which.

DETAILED DESCRIPTION

The present disclosure provides a turbine core ring design with predefined weakened sections, in the form of notches, to assure that an inevitable break is not at a turbine blade. The use of notches may be beneficial over segmented core rings due to easier assembly of the notched core ring.

Figure 1:
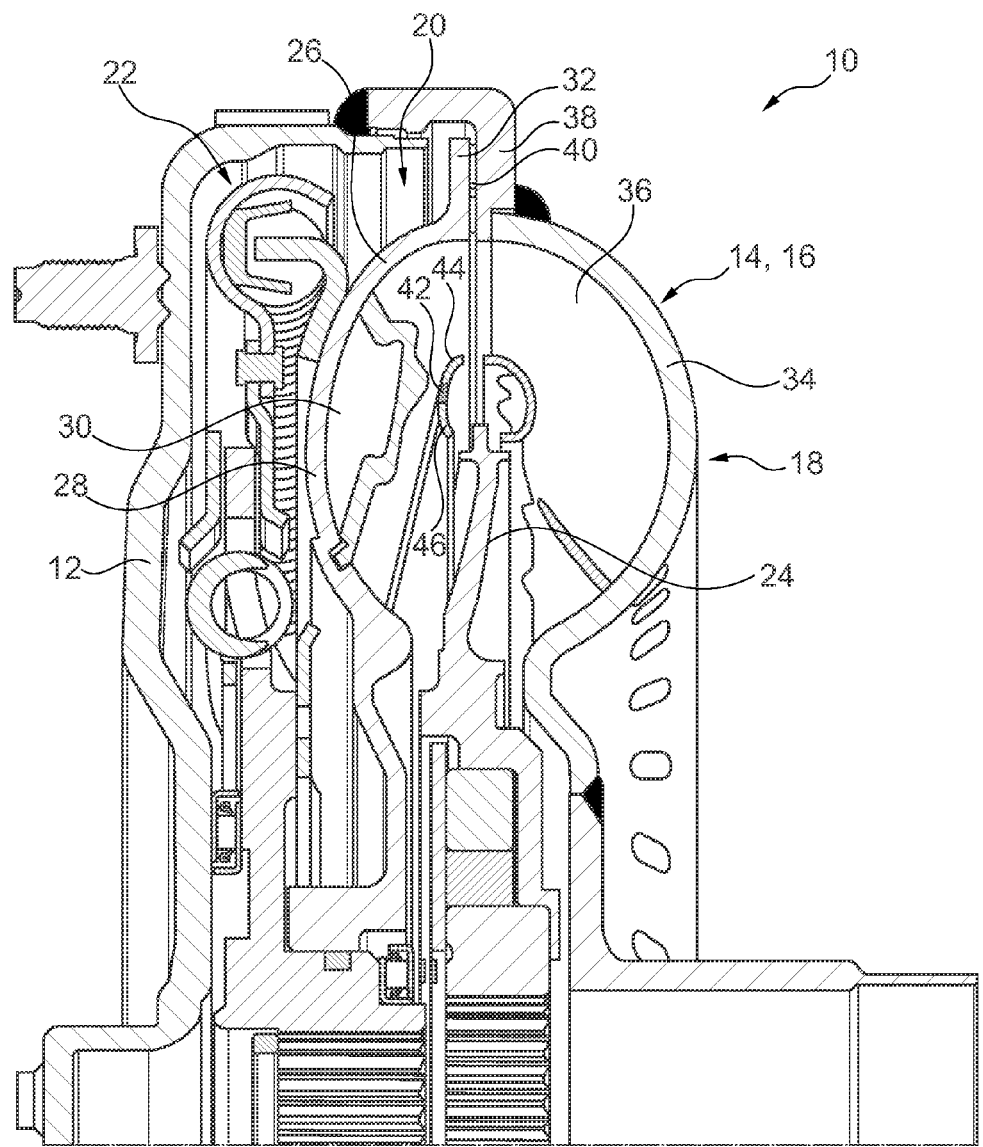
FIG. 1 shows a cross-sectional side view of a torque converter in accordance with an embodiment of the present invention.

FIG. 1 shows a cross-sectional side view of a torque converter 10 in accordance with an embodiment of the present invention. Torque converter 10 includes a front cover 12 for connecting to a crankshaft of an internal combustion engine and a rear cover 14 forming a shell 16 of an impeller or pump 18. Torque converter 10 also includes a turbine 20, which is connected to a damper assembly 22 that is circumferentially drivable by turbine 20 and is positioned between turbine 20 and front cover 12. Torque converter 10 also includes a stator 24 between turbine 20 and impeller 18. Turbine 20 includes a turbine shell 26 including a rounded blade supporting portion 28 for supporting a plurality of turbine blades 30 at a front cover side of the blades 30. Radially outside of blade supporting portion 28, turbine shell 26 includes an outer radial extension 32 radially protruding outwardly from an outer circumference of blade supporting portion 28. Impeller shell 16 includes a rounded blade supporting portion 34 for supporting a plurality of impeller blades 36. Radially outside of blade supporting portion 34, rear cover 14 includes a radially extending wall 38 radially protruding outwardly from an outer circumference of a blade supporting portion 34. Turbine 20 is configured to be axially slidable toward and away from impeller 18 to engage and disengage impeller shell 16 so as to form a lockup clutch. A friction material 40 is bonded onto a surface of outer radial extension 22 for engaging radially extending wall 38.

Turbine 20 further includes a core ring 42 for supporting turbine blades 30 at a rear cover side of blades 30. At the cross-section shown in FIG. 1, core ring 42 includes a radially outer notch 44 and a radially inner notch 46 formed therein.

Figure 2:
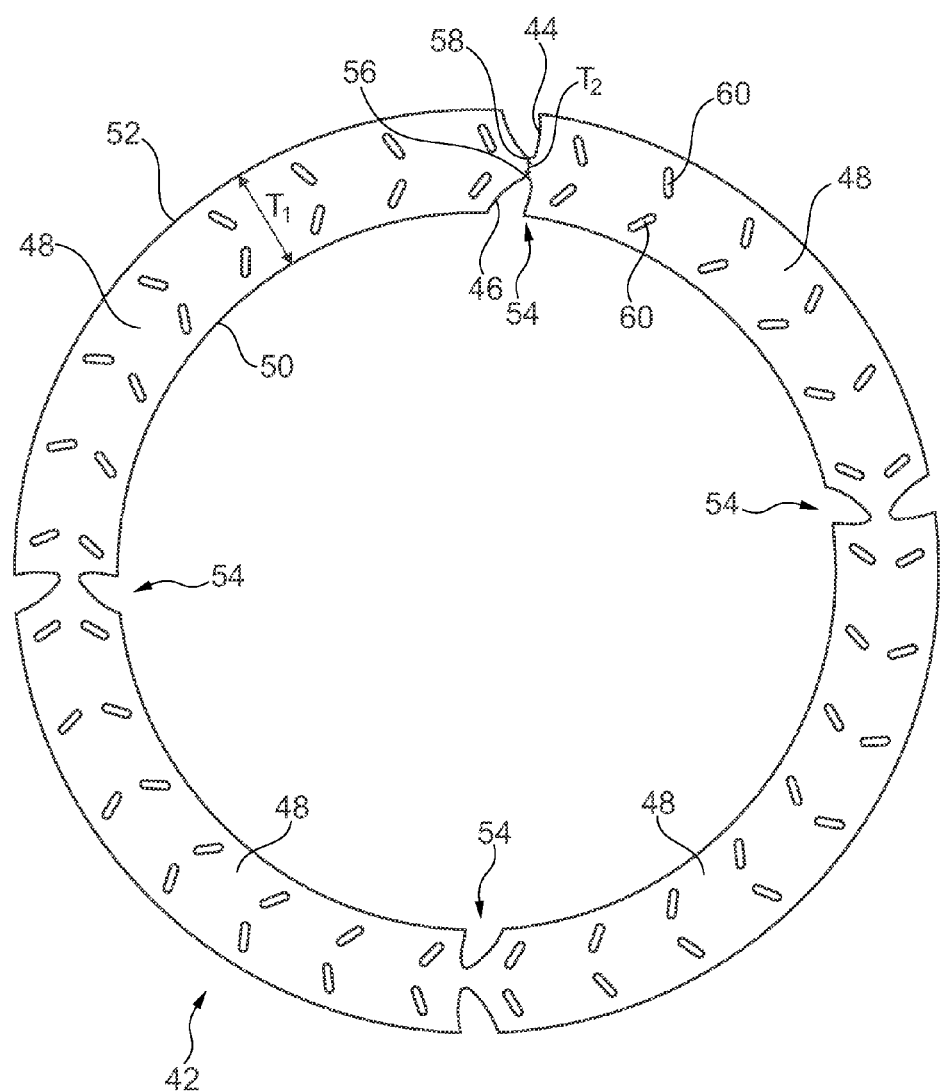
FIG. 2 shows a plan view of a turbine core ring in accordance with an embodiment of the present invention.

FIG. 2 shows a plan view of turbine core ring 42 in accordance with an embodiment of the present invention. Turbine core ring 42 includes a plurality of arc sections 48. In this embodiment, core ring 42 includes four arc sections 48, but in other embodiments more or less than four sections 48 may be included. Arc sections 48 each include an inner circumferential surface 50 defining an inner circumference of core ring 42 and an outer circumferential surface 52 defining an outer circumference of core ring 42. Extending radially between inner circumferential surface 50 and outer circumferential surface 52, arc sections 48 have a radial thickness T1. Arc sections 48 are circumferentially spaced apart from each other by weakened sections 54, which in this embodiment are each formed by one radially outer notch 44 and one radially inner notch 46. Each radially inner notch 46 extends radially outward from the inner circumferential surface 50 of two of arc sections 48 and each radially outer notch extends radially inward from outer circumferential surface 52 of two of arc sections 48. Weakened sections 54 each have a radial thickness T2 extending radially between a radially outer edge 56 of radially inner notch 46 to a radially inner edge 58 of radially outer notch 44. Radial thickness T2 is less than the radial thickness T1 of arc sections 48 such that an inner circumference of each of the weakened sections 54 is radially outside of the inner circumference of each arc section 48 and an outer circumference of each weakened section 54 is radially inside of the outer circumference of each arc section 48. Weakened sections 54 are configured to break during cycling of turbine 20. In alternative embodiments, each weakened section may be formed by only a radially inner notch 46 or a radially outer notch 44, or weakened sections may be formed by axially thinning a core ring.

Core ring 42 also includes a plurality turbine blade tab receiving slots 60 for receiving blade tabs or turbine blades 30 to connect turbine blades 30 to core ring 42. Slots 62 are formed only in arc sections 49 and not in weakened sections 54 such that when weakened sections 54 break during cycling, turbine blades 30 are not adversely affected by the breaks. In this embodiment, core ring 42 includes two radially aligned slots for each turbine blade 30.

Figure 3:
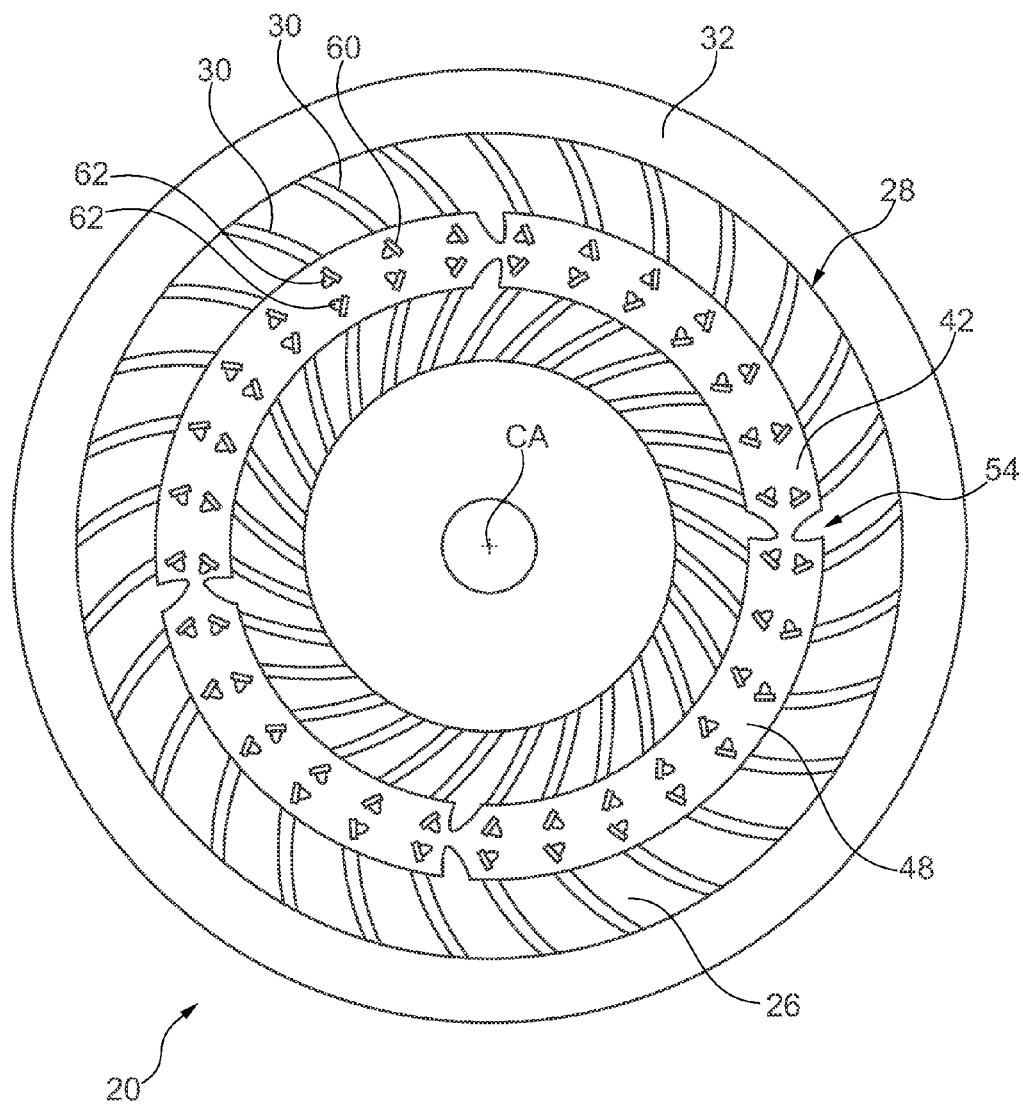
FIG. 3 shows a plan view of a turbine in accordance with an embodiment of the present invention.

FIG. 3 schematically shows a plan view of turbine 20 in accordance with an embodiment of the present invention. Turbine 20 includes turbine shell 26, turbine blades 30 and core ring 42. Turbine blades 30 are attached to core ring 42 by blade tabs 62 passing through blade receiving slots 60. Each blade 30 is attached to core ring 42 by two blade tabs 62. Turbine blades 30 are also connected to blade receiving portion 28 of turbine shell 26 by blade tabs. Blade tabs 62 and the blade tabs connecting blades 30 to turbine shell 26 may be brazed to core ring 42 and turbine shell 26, respectively, subsequent to the their attachment thereto. Outer radial extension 32 is shown radially outside of blades 30 with respect to a center axis CA of turbine 20.

Figure 4:
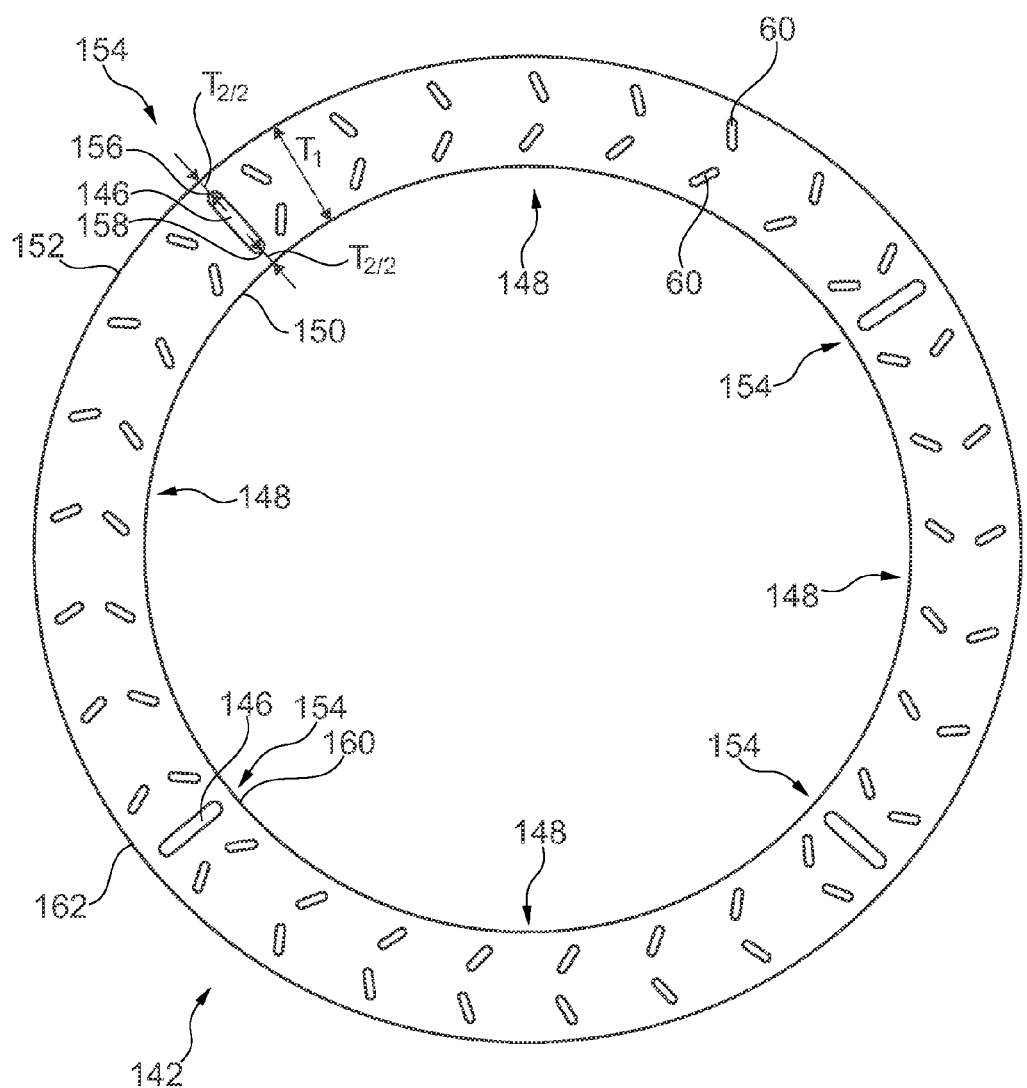
FIG. 4 shows a plan view of a turbine core ring in accordance with another embodiment of the present invention.

FIG. 4 shows a plan view of turbine core ring 142 in accordance with another embodiment of the present invention. Turbine core ring 142 includes a plurality of arc sections 148 and may be used in turbine 20 in place of turbine core ring 140. In this embodiment, core ring 142 includes four arc sections 148, but in other embodiments more or less than four sections 148 may be included. Arc sections 148 each include an inner circumferential surface 150 defining an inner circumference of core ring 142 and an outer circumferential surface 152 defining an outer circumference of core ring 142. Extending radially between inner circumferential surface 150 and outer circumferential surface 152, arc sections 148 have a radial thickness T1. Arc sections 148 are circumferentially spaced apart from each other by weakened sections 154, which in this embodiment are each formed by a slot 146 formed between the inner circumference and outer circumference of core ring 142. In contrast to the embodiment shown in FIGS. 1 to 3, weakened sections 154 do not extend radially away from circumferential surfaces 150, 152 into core ring 142, but instead include inner and outer circumferential surfaces 160, 162 that are circumferentially contiguous with circumferential surfaces 150, 152, respectively, and define therewith the inner and outer circumference of turbine core ring 142. Each radially extending slot 146 extends radially from a radially outer edge 156 of slot 146 to a radially inner edge 158 of slot 146. Between inner circumferential surface 160 and radially inner edge 158 weakened section 154 has a radial thickness T2/2 and between outer circumferential surface 162 and radially outer edge 156 weakened section 154 has a radial thickness T2/2. Thus, each weakened section 154 has a material total radial thickness T2 that is less than the radial thickness T1 of arc sections 148. Weakened sections 154 are configured to break during cycling of turbine 20.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter turbine comprising:
   a turbine core ring comprising:
      a plurality of arc sections having an inner circumference and an outer circumference; and
      a plurality of weakened sections connecting the arc sections to each other, the weakened sections each having a lesser strength than each of the arc sections;
   a plurality of turbine blades connected to the torque converter turbine core ring; and
   a turbine shell connected to the turbine blades opposite the turbine core ring,
   wherein the turbine blades are connected to the arc sections,
   wherein turbine blades are not connected to the weakened section.

2. The torque converter turbine as recited in claim 1 wherein each of the plurality of weakened sections are radially thinner than each of the arc sections such that at least one of an inner circumference of each of the weakened sections is radially outside of the inner circumference of each of the arc sections and an outer circumference of each of the weakened sections is radially inside of the outer circumference of each of the arc sections.

3. The torque converter turbine as recited in claim 2 wherein the inner circumference of the each of the weakened sections is radially outside of the inner circumference of each of the arc sections and the outer circumference of the each of the weakened sections is radially inside of the outer circumference of each of the arc sections.

4. The torque converter turbine as recited in claim 3 wherein each of the weakened sections is formed by an inner notch extending radially outward from the inner circumference of two of the arc sections and an outer notch extending radially inward from the outer circumference of two of the arc sections.

5. The torque converter turbine as recited in claim 1 wherein each of the arc sections includes a plurality of tab slots receiving tabs of the turbine blades.

6. The torque converter turbine as recited in claim 1 wherein the weakened sections are configured to break before the arc sections during cycling of a turbine in which the torque converter turbine core ring is included.

7. The torque converter turbine as recited in claim 1 wherein each weakened section is formed by a slot between an inner circumference and an outer circumference of the turbine core ring.

8. The torque converter turbine as recited in claim 1 wherein the turbine is axially movable, the turbine shell including a blade supporting portion supporting the turbine blades and an outer radial extension radially protruding outwardly from an outer circumference of the blade supporting portion, the outer radial extension configured for engaging an impeller shell.

9. A torque converter comprising:
   the torque converter turbine as recited in claim 1; and
   an impeller shell.

10. The torque converter as recited in claim 9 wherein the turbine is axially movable to engage and disengage the impeller shell so as to form a lockup clutch.

11. A method of forming a torque converter turbine comprising:
   forming a core ring to include a plurality of arc sections and a plurality of weakened sections connecting the arc sections to each other, the weakened sections each having a lesser strength than each of the arc sections, the arc sections having an inner circumference and an outer circumference, the arc sections each including a plurality of tab slots formed therein configured for receiving tabs of turbine blades, the tab slots being entirely between the inner circumference and the outer circumference, the weakened sections being formed by notches or slots having a different configuration than the tab slots such that the core ring is formed as an integral one-piece ring with each of the arc sections being integral with two of the weakened sections; and
   connecting the turbine blades to the arc sections by inserting the tabs of the turbine blades into the tab slots.

12. The method as recited in claim 11 wherein the forming the core ring includes forming the weakened sections by providing notches extending radially into at least one of an inner circumference or an outer circumference of the core ring.

13. The method as recited in claim 11 further comprising connecting the turbine blades to a turbine shell.

14. The method as recited in claim 13 further comprising forming the turbine shell to include a blade supporting portion supporting the turbine blades and an outer radial extension radially protruding outwardly from an outer circumference of the blade supporting portion, the outer radial extension configured for engaging an impeller shell.

15. A torque converter turbine core ring comprising:
a plurality of arc sections having an inner circumference and an outer circumference; and
a plurality of weakened sections connecting the arc sections to each other, the weakened sections each having a lesser strength than each of the arc sections,
wherein each of the plurality of weakened sections are radially thinner than each of the arc sections such that an inner circumference of each of the weakened sections is radially outside of the inner circumference of each of the arc sections and an outer circumference of each of the weakened sections is radially inside of the outer circumference of each of the arc sections.

16. The torque converter turbine core ring as recited in claim 15 wherein each of the weakened sections is formed by an inner notch extending radially outward from the inner circumference of two of the arc sections and an outer notch extending radially inward from the outer circumference of two of the arc sections.

\* \* \* \* \*